(12) United States Patent
Lee

(10) Patent No.: US 12,096,801 B2
(45) Date of Patent: Sep. 24, 2024

(54) AEROSOL-GENERATING DEVICE AND METHOD FOR BLOCKING HEATER HEAT CAUSED BY ERRONEOUS OPERATION

(71) Applicant: KT&G CORPORATION, Daejeon (KR)

(72) Inventor: Seung Won Lee, Gwangmyeong-si (KR)

(73) Assignee: KT&G CORPORATION, Daejeon (KR)

( * ) Notice: Subject to any disclaimer, the term of this patent is extended or adjusted under 35 U.S.C. 154(b) by 1039 days.

(21) Appl. No.: 16/982,707

(22) PCT Filed: Nov. 7, 2019

(86) PCT No.: PCT/KR2019/015025
§ 371 (c)(1),
(2) Date: Sep. 21, 2020

(87) PCT Pub. No.: WO2020/122423
PCT Pub. Date: Jun. 18, 2020

(65) Prior Publication Data
US 2021/0007404 A1  Jan. 14, 2021

(30) Foreign Application Priority Data

Dec. 13, 2018 (KR) .................. 10-2018-0161180

(51) Int. Cl.
*A24F 40/53* (2020.01)
*A24F 40/40* (2020.01)
(Continued)

(52) U.S. Cl.
CPC .............. *A24F 40/53* (2020.01); *A24F 40/40* (2020.01); *H05B 1/0202* (2013.01); *H05B 1/0227* (2013.01); *H05B 6/06* (2013.01)

(58) Field of Classification Search
CPC .......... A24F 40/53; A24F 40/40; A24F 40/20; A24F 40/30; A24F 40/50; A24F 40/46;
(Continued)

(56) References Cited

U.S. PATENT DOCUMENTS

| 5,378,874 A | 1/1995 | Holling et al. |
| 5,627,482 A * | 5/1997 | Lamatsch ............... H03K 3/03 |
| | | 327/295 |

(Continued)

FOREIGN PATENT DOCUMENTS

| CN | 101098570 A | 1/2008 |
| CN | 201976078 U | 9/2011 |

(Continued)

OTHER PUBLICATIONS

Chinese Office Action dated Jan. 5, 2023 in Chinese Application No. 201980012413.2.

(Continued)

*Primary Examiner* — Travis S Chambers
(74) *Attorney, Agent, or Firm* — Sughrue Mion, PLLC

(57) ABSTRACT

Provided is an aerosol-generating device including a heater, a first switch, a second switch, a first processor that outputs a first control signal for controlling an open/closed state of the first switch, and a second processor that communicates with the first processor. The second processor outputs a second control signal that controls an open/closed state of the second switch such that the open/closed state of the second switch is changed based on a communication status with the first processor.

11 Claims, 12 Drawing Sheets

(51) Int. Cl.
  *H05B 1/02* (2006.01)
  *H05B 6/06* (2006.01)
(58) Field of Classification Search
  CPC ....... A24F 40/51; A24F 40/65; H05B 1/0202;
      H05B 1/0227; H05B 6/06; H05B 1/02;
      H02H 3/05; G05B 11/28; H03K 17/223
  See application file for complete search history.

(56) References Cited

U.S. PATENT DOCUMENTS

| | | | |
|---|---|---|---|
| 6,112,135 | A | 8/2000 | Peterson et al. |
| 9,497,999 | B2 | 11/2016 | Lord |
| 9,713,345 | B2 | 7/2017 | Farine et al. |
| 9,872,521 | B2 | 1/2018 | Farine et al. |
| 9,955,724 | B2 | 5/2018 | Lord |
| 10,045,561 | B2 | 8/2018 | Flick |
| 10,492,533 | B2 | 12/2019 | Bernauer et al. |
| 10,809,749 | B2 | 10/2020 | Gu et al. |
| 10,925,315 | B2 | 2/2021 | Bilat |
| 11,172,887 | B2 | 11/2021 | Yamazaki et al. |
| 11,406,775 | B2 | 8/2022 | Scott et al. |
| 2014/0366894 | A1 | 12/2014 | Liu |
| 2016/0331038 | A1 | 11/2016 | Farine et al. |
| 2017/0224022 | A1 | 8/2017 | Liu |
| 2017/0303595 | A1 | 10/2017 | Bernauer et al. |
| 2018/0098576 | A1 | 4/2018 | Hedarchet |
| 2018/0132530 | A1 | 5/2018 | Rogers et al. |
| 2018/0235282 | A1* | 8/2018 | Gao .................. A24F 40/53 |
| 2018/0326816 | A1 | 11/2018 | Otsuka |
| 2020/0086068 | A1 | 3/2020 | Lee et al. |

FOREIGN PATENT DOCUMENTS

| | | |
|---|---|---|
| CN | 204599333 U | 9/2015 |
| CN | 105027016 A | 11/2015 |
| CN | 105468051 A | 4/2016 |
| CN | 106132295 A | 11/2016 |
| CN | 106559928 A | 4/2017 |
| CN | 106714596 A | 5/2017 |
| CN | 206314582 U | 7/2017 |
| CN | 206713087 U | 12/2017 |
| EA | 201390953 A1 | 11/2013 |
| EP | 3 206 513 A1 | 8/2017 |
| GB | 2323224 A | 9/1998 |
| JP | 2015-211583 A | 11/2015 |
| KR | 10-2013-0130763 A | 12/2013 |
| KR | 10-2015-0084779 A | 7/2015 |
| KR | 10-1570876 B1 | 11/2015 |
| KR | 10-1619034 B1 | 5/2016 |
| KR | 10-2017-0066337 A | 6/2017 |
| KR | 10-2017-0086107 A | 7/2017 |
| KR | 10-1768085 B1 | 8/2017 |
| KR | 10-2017-0129710 A | 11/2017 |
| KR | 10-2018-0011076 A | 1/2018 |
| KR | 10-2018-0124740 A | 11/2018 |
| RU | 2 595 593 C2 | 8/2016 |
| WO | 2016/058904 A1 | 4/2016 |

OTHER PUBLICATIONS

Extended European Search Report dated Dec. 3, 2021 in European Application No. 19896837.2.
Communication dated Oct. 20, 2021 from the Russian Patent Office in Russian Application No. 2021113678.
International Search Report [PCT/ISA/210] of PCT/KR2019/015025 dated Feb. 14, 2020.
Written Opinion [PCT/ISA/237] of PCT/KR2019/015025 dated Feb. 14, 2020.
Notification of Reason for Refusal dated Jul. 13, 2021 from the Korean Intellectual Property Office in KR Application No. 10-2021-0048023.
Office Action issued Feb. 11, 2022 in Russian Application No. 2021113678/03.
Extended European Search Report dated Nov. 16, 2022 from the European Patent Office in EP Application No. 22185513.3.
Chinese Office Action dated Jul. 19, 2023 in Chinese Application No. 201980012413.2.

\* cited by examiner

AEROSOL-GENERATING DEVICE AND METHOD FOR BLOCKING HEATER HEAT CAUSED BY ERRONEOUS OPERATION

CROSS REFERENCE TO RELATED APPLICATIONS

This application is a National Stage of International Application No. PCT/KR2019/015025 filed on Nov. 7, 2019, claiming priority based on Korean Patent Application No. 10-2018-0161180 filed Dec. 13, 2018, the disclosure of which is incorporated herein in its entirely by reference.

TECHNICAL FIELD

The disclosure relates to an aerosol-generating device, and more particularly, to an aerosol-generating device that blocks heat generation of a heater due to malfunction of a processor or the like.

BACKGROUND ART

Recently, the demand for alternative methods to overcome the shortcomings of traditional cigarettes has increased. For example, there is growing demand for a method of generating aerosol by heating an aerosol-generating material, rather than by combusting cigarettes. Accordingly, research into heating-type cigarettes and heating-type aerosol-generating devices has been actively conducted.

A heater of the aerosol-generating device heats a cigarette inserted into the aerosol-generating device. The aerosol-generating device may control power supplied to the heater based on a preset temperature profile.

However, even when a failure occurs in a processor or the like that controls the heater, the heater may continue to generate heat. In this case, the heater may generate heat differently from the temperature profile. As a result, the optimum taste may not be provided to a user, and there may be a safety problem. Accordingly, there is a need for a technique for preventing the heater from generating heat due to a malfunction of the aerosol-generating device.

DESCRIPTION OF EMBODIMENTS

Technical Problem

Provided are an apparatus and a method for generating an aerosol to block heat generation of a heater due to malfunction.

The technical problems are not limited to the above-described description, and other technical problems may be derived from the embodiments to be described hereinafter.

Solution to Problem

An aerosol-generating device according to an aspect includes: a heater; a first switch electrically connected to the heater in series; a second switch electrically connected to the heater and the first switch in series; a first processor configured to output a first control signal that controls an open/closed state of the first switch; and a second processor configured to perform communication with the first processor and output a second control signal that controls an open/closed state of the second switch such that the open/closed state of the second switch is changed according to a communication status with the first processor.

Advantageous Effects of Disclosure

As the first processor and the second processor control the first switch and the second switch, respectively, the heater may be prevented from operating abnormally if at least one processor of the first processor and the second processor malfunctions.

In addition, as a rectifying circuit is connected to an output terminal of the first processor and a capacitor is connected to on output terminal of the second processor, the heater may be prevented from operating abnormally if at least one processor of the first processor and the second processor malfunctions.

BEST MODE

Figure 1:
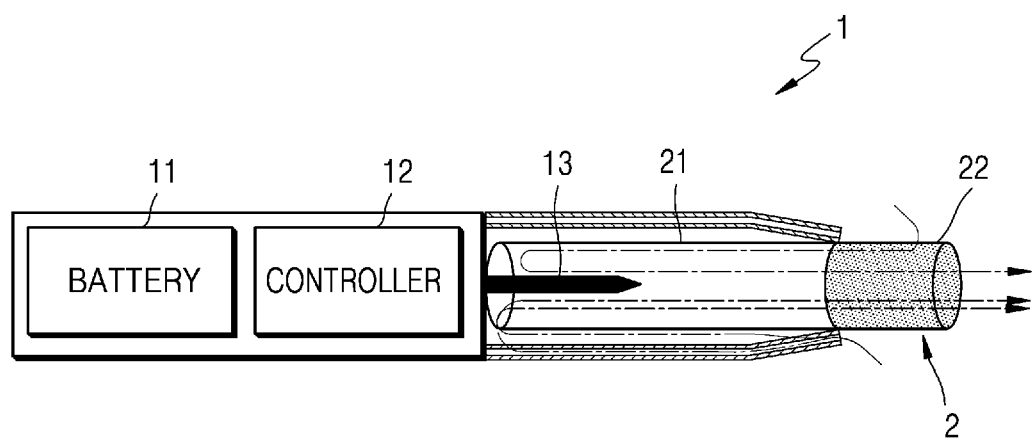
FIGS. 1 to 3 are diagrams showing examples in which a cigarette is inserted into an aerosol-generating device.

According to an aspect, an aerosol-generating device includes: a heater; a first switch electrically connected to the heater in series; a second switch electrically connected to the heater and the first switch in series; a first processor configured to output a first control signal that controls an open/closed state of the first switch; and a second processor configured to perform communication with the first processor and output a second control signal that controls an open/closed state of the second switch such that the open/closed state of the second switch is changed according to a communication state with the first processor.

In the aerosol-generating device, when the communication status with the first processor is defective, the second processor outputs the second control signal such that the second switch is opened.

In the aerosol-generating device, the first processor outputs the first control signal so that the open/closed state of the first switch is changed according to a communication status with the second processor.

In the aerosol-generating device, when the communication status with the second processor is defective, the first processor outputs the first control signal such that the first switch is opened.

In the aerosol-generating device, the first processor and the second processor perform serial communication.

In the aerosol-generating device, the first control signal is a signal that closes the first switch during a period in which the heater is heated, and the second control signal is a signal that repeatedly opens and closes the second switch according to a power duty cycle of the heater during the period in which the heater is heated.

In the aerosol-generating device, the first switch and the second switch are field effect transistors.

The aerosol-generating device further includes a rectifying circuit electrically connected to an output terminal of the first processor and an input terminal of the first switch.

In the aerosol-generating device, the first control signal and the second control signal are pulse width modulation signals.

The aerosol-generating device further includes a capacitor electrically connected to an output terminal of the second processor and an input terminal of the second switch.

In the aerosol-generating device, at least one processor of the first processor and the second processor receives a temperature sensing value of the heater, and the at least one processor outputs a control signal so that at least one of the first and second switches corresponding to the at least one processor is opened when the received temperature sensing value is abnormal.

According to another aspect, an aerosol-generating device includes: a heater; a first switch electrically connected to the heater in series; a second switch electrically connected to the heater and the first switch in series; a processor which outputs a first control signal that controls an open/closed state of the first switch and a second control signal that controls an open/closed state of the second switch; a rectifying circuit electrically connected to an output terminal of the processor and an input terminal of the first switch; and a capacitor electrically connected to an output terminal of the processor and an input terminal of the second switch.

In the aerosol-generating device, the first control signal and the second control signal are pulse width modulation signals.

According to another aspect, a method of blocking power for a heater of an aerosol-generating device includes: outputting, from a first processor, a signal that controls an open/closed state of a first switch electrically connected to the heater in series; outputting, from a second processor, a signal that controls an open/closed state of a second switch electrically connected to the heater and the first switch in series; performing communication between the first processor and the second processor; and outputting, from at least one processor of the first and second processors, a signal that controls at least one of the first and second switches corresponding to the at least one processor to be opened according to a communication status between the first processor and the second processor.

MODE OF DISCLOSURE

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, terms which are not commonly used may be selected. In such a case, the meanings of the terms will be described in detail at the corresponding portions in the following description of the embodiments. Therefore, the terms used in the various embodiments should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

Hereinafter, the embodiments of the present disclosure will be described in detail with reference to the accompanying drawings.

Figure 2:
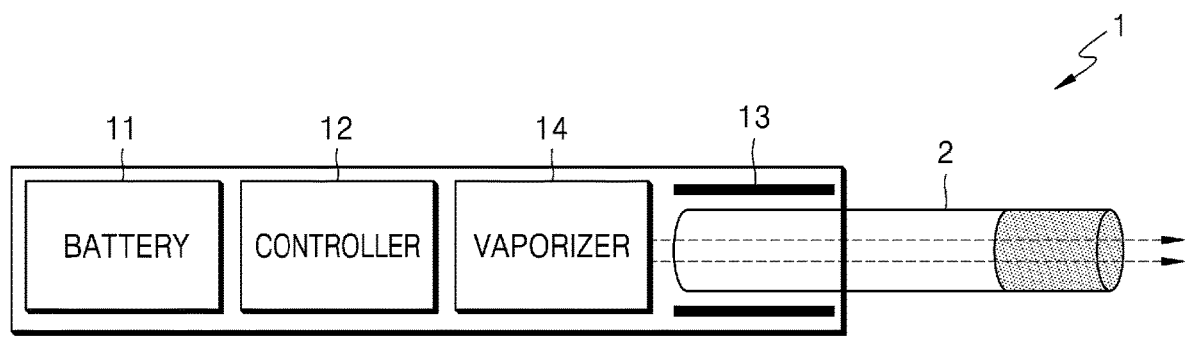
Figure 3:
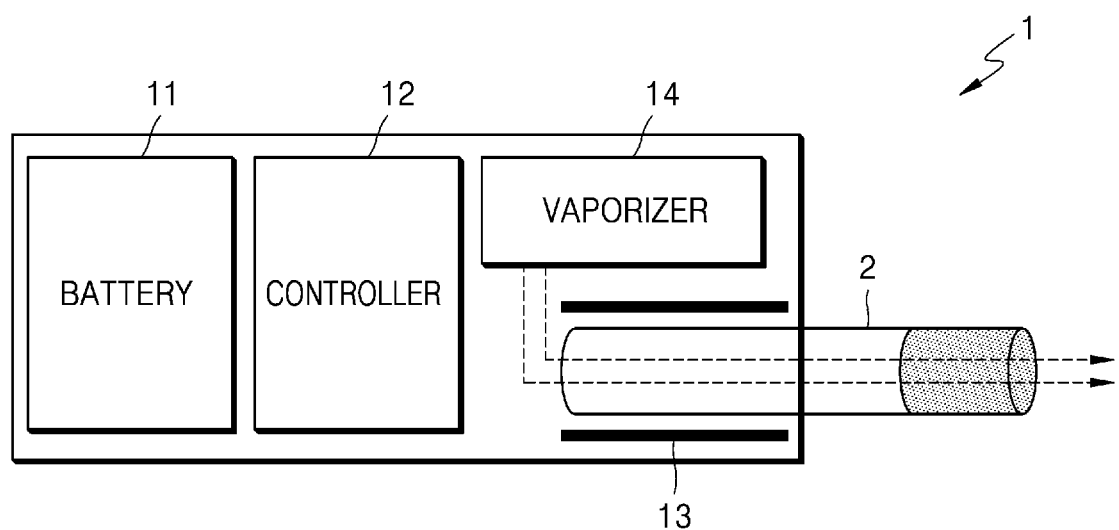

FIGS. 1 through 3 are diagrams showing examples in which a cigarette is inserted into an aerosol generating device.

Referring to FIG. 1, the aerosol generating device 1 may include a battery 11, a controller 12, and a heater 13. Referring to FIGS. 2 and 3, the aerosol generating device 1 may further include a vaporizer 14. Also, the cigarette 2 may be inserted into an inner space of the aerosol generating device 1.

FIGS. 1 through 3 illustrate components of the aerosol generating device 1, which are related to the present embodiment. Therefore, it will be understood by one of ordinary skill in the art related to the present embodiment that other general-purpose components may be further included in the aerosol generating device 1, in addition to the components illustrated in FIGS. 1 through 3.

FIG. 1 illustrates that the battery 11, the controller 12, and the heater 13 are arranged in series. Also, FIG. 2 illustrates that the battery 11, the controller 12, the vaporizer 14, and the heater 13 are arranged in series. Also, FIG. 3 illustrates that the vaporizer 14 and the heater 13 are arranged in parallel. However, the internal structure of the aerosol generating device 1 is not limited to the structures illustrated in FIGS. 1 through 3. In other words, according to the design of the aerosol generating device 1, the battery 11, the controller 12, the heater 13, and the vaporizer 14 may be differently arranged.

When the cigarette 2 is inserted into the aerosol generating device 1, the aerosol generating device 1 may operate the heater 13 and/or the vaporizer 14 to generate an aerosol. The aerosol generated by the heater 13 and/or the vaporizer 14 is delivered to a user by passing through the cigarette 2.

As necessary, even when the cigarette 2 is not inserted into the aerosol generating device 1, the aerosol generating device 1 may heat the heater 13.

The battery 11 may supply power to be used for the aerosol generating device 1 to operate. For example, the battery 11 may supply power to heat the heater 13 or the vaporizer 14, and may supply power for operating the controller 12. Also, the battery 11 may supply power for operations of a display, a sensor, a motor, etc. mounted in the aerosol generating device 1.

The controller 12 may control overall operations of the aerosol generating device 1. In detail, the controller 12 may control not only operations of the battery 11, the heater 13, and the vaporizer 14, but also operations of other components included in the aerosol generating device 1. Also, the controller 12 may check a state of each of the components of the aerosol generating device 1 to determine whether or not the aerosol generating device 1 is able to operate.

The controller 12 may include at least one processor. A processor can be implemented as an array of a plurality of logic gates or can be implemented as a combination of a general-purpose microprocessor and a memory in which a program executable in the microprocessor is stored. It will be understood by one of ordinary skill in the art that the processor can be implemented in other forms of hardware.

The heater 13 may be heated by the power supplied from the battery 11. For example, when the cigarette is inserted into the aerosol generating device 1, the heater 13 may be located outside the cigarette. Thus, the heated heater 13 may increase a temperature of an aerosol generating material in the cigarette.

The heater 13 may include an electro-resistive heater. For example, the heater 13 may include an electrically conductive track, and the heater 13 may be heated when currents flow through the electrically conductive track. However, the heater 13 is not limited to the example described above and may include all heaters which may be heated to a desired temperature. Here, the desired temperature may be pre-set in the aerosol generating device 1 or may be set as a temperature desired by a user.

As another example, the heater 13 may include an induction heater. In detail, the heater 13 may include an electrically conductive coil for heating a cigarette in an induction heating method, and the cigarette may include a susceptor which may be heated by the induction heater.

For example, the heater 13 may include a tube-type heating element, a plate-type heating element, a needle-type heating element, or a rod-type heating element, and may heat the inside or the outside of the cigarette 2, according to the shape of the heating element.

Also, the aerosol generating device 1 may include a plurality of heaters 13. Here, the plurality of heaters 13 may be inserted into the cigarette 2 or may be arranged outside the cigarette 2. Also, some of the plurality of heaters 13 may be inserted into the cigarette 2 and the others may be arranged outside the cigarette 2. In addition, the shape of the heater 13 is not limited to the shapes illustrated in FIGS. 1 through 3 and may include various shapes.

The vaporizer 14 may generate an aerosol by heating a liquid composition and the generated aerosol may pass through the cigarette 2 to be delivered to a user. In other words, the aerosol generated via the vaporizer 14 may move along an air flow passage of the aerosol generating device 1 and the air flow passage may be configured such that the aerosol generated via the vaporizer 14 passes through the cigarette to be delivered to the user.

For example, the vaporizer 14 may include a liquid storage, a liquid delivery element, and a heating element, but it is not limited thereto. For example, the liquid storage, the liquid delivery element, and the heating element may be included in the aerosol generating device 1 as independent modules.

The liquid storage may store a liquid composition. For example, the liquid composition may be a liquid including a tobacco-containing material having a volatile tobacco flavor component, or a liquid including a non-tobacco material. The liquid storage may be formed to be detachable from the vaporizer 14, or may be formed integrally with the vaporizer 14.

For example, the liquid composition may include water, a solvent, ethanol, plant extract, spices, flavorings, or a vitamin mixture. The spices may include menthol, peppermint, spearmint oil, and various fruit-flavored ingredients, but are not limited thereto. The flavorings may include ingredients capable of providing various flavors or tastes to a user. Vitamin mixtures may be a mixture of at least one of vitamin A, vitamin B, vitamin C, and vitamin E, but are not limited thereto. Also, the liquid composition may include an aerosol forming substance, such as glycerin and propylene glycol.

The liquid delivery element may deliver the liquid composition of the liquid storage to the heating element. For example, the liquid delivery element may be a wick such as cotton fiber, ceramic fiber, glass fiber, or porous ceramic, but is not limited thereto.

The heating element is an element for heating the liquid composition delivered by the liquid delivery element. For example, the heating element may be a metal heating wire, a metal hot plate, a ceramic heater, or the like, but is not limited thereto. In addition, the heating element may include a conductive filament such as nichrome wire and may be positioned as being wound around the liquid delivery element. The heating element may be heated by a current supply and may transfer heat to the liquid composition in contact with the heating element, thereby heating the liquid composition. As a result, aerosol may be generated.

For example, the vaporizer 14 may be referred to as a cartomizer or an atomizer, but it is not limited thereto.

The aerosol generating device 1 may further include general-purpose components in addition to the battery 11, the controller 12, the heater 13, and the vaporizer 14. For example, the aerosol generating device 1 may include a display capable of outputting visual information and/or a motor for outputting haptic information. Also, the aerosol generating device 1 may include at least one sensor. Also, the aerosol generating device 1 may be formed as a structure where, even when the cigarette 2 is inserted into the aerosol generating device 1, external air may be introduced or internal air may be discharged.

Although not illustrated in FIGS. 1 through 3, the aerosol generating device 1 and an additional cradle may form together a system. For example, the cradle may be used to charge the battery 11 of the aerosol generating device 1. Alternatively, the heater 13 may be heated when the cradle and the aerosol generating device 1 are coupled to each other.

The cigarette 2 may be similar as a general combustive cigarette. For example, the cigarette 2 may be divided into a first portion including an aerosol generating material and a second portion including a filter, etc. The second portion of the cigarette 2 may also include an aerosol generating material. For example, an aerosol generating material made in the form of granules or capsules may be inserted into the second portion.

The entire first portion may be inserted into the aerosol generating device 1, and the second portion may be exposed to the outside. Alternatively, only a portion of the first portion may be inserted into the aerosol generating device 1, or the entire first portion and a portion of the second portion may be inserted into the aerosol generating device 1. The user may puff aerosol while holding the second portion by the mouth of the user. In this case, the aerosol is generated by the external air passing through the first portion, and the generated aerosol passes through the second portion and is delivered to the user's mouth.

For example, the external air may flow into at least one air passage formed in the aerosol generating device 1. For example, opening and closing of the air passage and/or a size of the air passage may be adjusted by the user. Accordingly, the amount and quality of the aerosol may be adjusted by the user. As another example, the external air may flow into the cigarette 2 through at least one hole formed in a surface of the cigarette 2.

Hereinafter, examples of the cigarette 2 will be described with reference to FIGS. 4 and 5.

Figure 4:
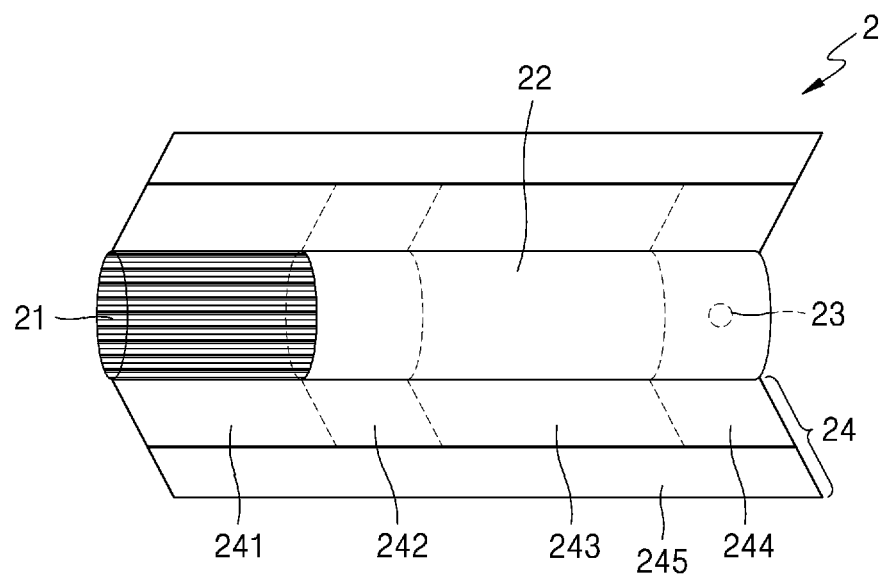
FIGS. 4 and 5 are diagrams showing examples of cigarettes.
Figure 5:
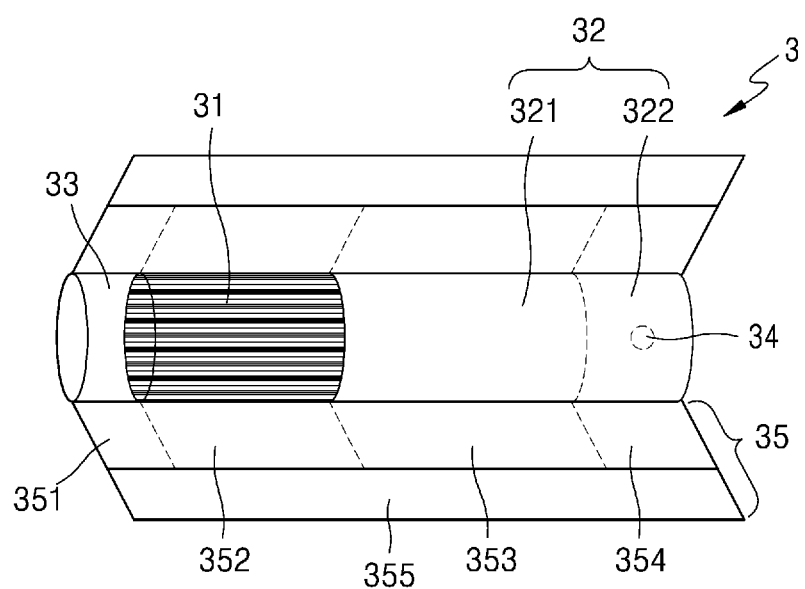

FIGS. 4 and 5 are diagrams showing examples of cigarettes.

Referring to FIG. 4, the cigarette 2 may include a tobacco rod 21 and a filter rod 22. The first portion described above with reference to FIGS. 1 through 3 may include the tobacco rod 21, and the second portion may include the filter rod 22.

FIG. 4 illustrates that the filter rod 22 includes a single segment. However, the filter rod 22 is not limited thereto. In other words, the filter rod 22 may include a plurality of segments. For example, the filter rod 22 may include a first segment configured to cool an aerosol and a second segment configured to filter a certain component included in the aerosol. Also, as necessary, the filter rod 22 may further include at least one segment configured to perform other functions.

The cigarette 2 may be packaged by at least one wrapper 24. The wrapper 24 may have at least one hole through which external air or internal gas flows. As an example, the cigarette 2 may be packaged by one wrapper 24. As another example, the cigarette 2 may also be packaged by two or more wrappers 24. For example, the tobacco rod 21 may be packaged by a first wrapper 241, and the filter rod 22 may be packaged by wrappers 242, 243, and 244. And, the cigarette 2 may be entirely repackaged by a single wrapper 245. When the filter rod 22 is composed of a plurality of segments, each segment may be packaged by the wrappers 242, 243 and 244.

The tobacco rod 21 may include an aerosol generating material. For example, the aerosol generating material may include at least one of glycerin, propylene glycol, ethylene glycol, dipropylene glycol, diethylene glycol, triethylene glycol, tetraethylene glycol, and oleyl alcohol, but it is not limited thereto. Also, the tobacco rod 21 may include other additives, such as flavors, a wetting agent, and/or organic acid. Also, the tobacco rod 21 may include a flavored liquid, such as menthol or a moisturizer, which is injected to the tobacco rod 21.

The tobacco rod 21 may be manufactured in various forms. For example, the tobacco rod 21 may be formed as a sheet or a strand. Also, the tobacco rod 21 may be formed as a pipe tobacco, which is formed of tiny bits cut from a tobacco sheet. Also, the tobacco rod 21 may be surrounded by a heat conductive material. For example, the heat-conducting material may be, but is not limited to, a metal foil such as aluminum foil. For example, the heat conductive material surrounding the tobacco rod 21 may uniformly distribute heat transmitted to the tobacco rod 21, and thus, the heat conductivity applied to the tobacco rod may be increased and taste of the tobacco may be improved. Also, the heat conductive material surrounding the tobacco rod 21 may function as a susceptor heated by the induction heater. Here, although not illustrated in the drawings, the tobacco rod 21 may further include an additional susceptor, in addition to the heat conductive material surrounding the tobacco rod 21.

The filter rod 22 may include a cellulose acetate filter. Shapes of the filter rod 22 are not limited. For example, the filter rod 22 may include a cylinder-type rod or a tube-type rod having a hollow inside. Also, the filter rod 22 may include a recess-type rod. When the filter rod 22 includes a plurality of segments, at least one of the plurality of segments may have a different shape.

Also, the filter rod 22 may include at least one capsule 23. Here, the capsule 23 may generate a flavor or an aerosol. For example, the capsule 23 may have a configuration in which a liquid containing a flavoring material is wrapped with a film. For example, the capsule 23 may have a spherical or cylindrical shape, but is not limited thereto.

Referring to FIG. 5, the cigarette 3 may further include a front end plug 33. The front end plug 33 may be located on a side of the tobacco rod 31 opposite the filter rod 32. The front end plug 33 may prevent the tobacco rod 31 from falling off and prevent a liquefied aerosol from flowing into the aerosol-generating device 1 (see FIGS. 1 to 3) from the tobacco rod 31, during smoking.

The filter rod 32 may include a first segment 321 and a second segment 322. Here, the first segment 321 may correspond to the first segment of the filter rod 22 of FIG. 4, and the second segment 322 may correspond to the third segment of the filter rod 22 of FIG. 4.

The cigarette 3 may be packaged by at least one wrapper 35. The wrapper 35 may have at least one hole through which external air or internal gas flows. For example, the front end plug 33 may be packaged by a first wrapper 351, the tobacco rod 31 may be packaged by a second wrapper 352, the first segment 321 may be packaged by a third wrapper (353), and the second segment 322 may be packaged by a fourth wrapper 354. Then, the cigarette 3 may be entirely repackaged by a fifth wrapper 355.

Also, the second segment 322 may include at least one capsule 34. Here, the capsule 34 may generate flavor or an aerosol. For example, the capsule 34 may have a configuration in which a liquid containing a flavoring material is wrapped with a film. For example, the capsule 34 may have a spherical or cylindrical shape, but is not limited thereto.

The heater may generate heat even when a failure occurs in the aerosol-generating device. For example, due to a malfunction of a processor, the heater may generate heat when it is not supposed to do so, or may generate excessive heat against a temperature profile. Here, the temperature profile of the heater may be preset for heating the heater. In addition, the heater may generate heat due to various malfunctions. In this case, the optimum taste may not be provided to a user, and there may be a safety problem in using an aerosol-generating device.

Hereinafter, a heater control circuit and a heater control method for preventing heater from generating heat due to a malfunction of the aerosol-generating device will be described.

Figure 6:
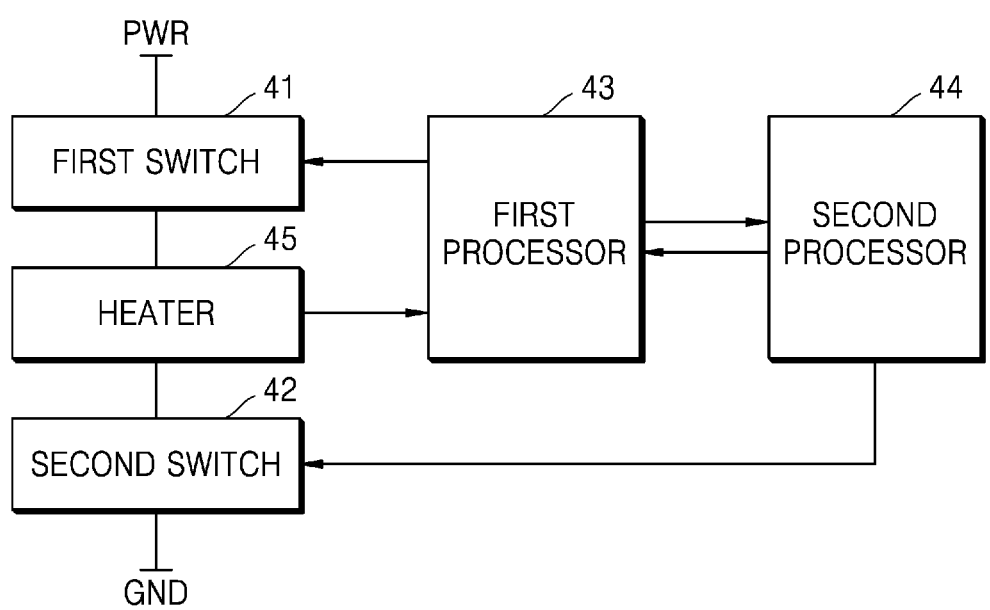
FIG. 6 is a diagram schematically showing an example of a heater control circuit of an aerosol-generating device.

FIG. 6 is a diagram schematically showing an example of a heater control circuit of an aerosol-generating device.

Referring to FIG. 6, the heater control circuit includes a heater 45, a first switch 41, a second switch 42, a first processor 43, and a second processor 44.

The first processor 43 and the second processor 44 may be included in the controller 12 illustrated in FIGS. 1 to 3. The first switch 41 and the second switch 42 may be included in the controller 12 illustrated in FIGS. 1 to 3 or may be included in a heater that is controlled by the controller 12.

The heater control circuit is applicable to all heating elements included in the aerosol-generating device. For example, the heater 45 may be a heater 3 for heating the cigarette shown in FIGS. 1 to 3. As another example, the heater 45 may be a heating element included in the vaporizer 14 shown in FIGS. 2 and 3. As another example, when the aerosol-generating device further includes heating elements other than those shown in FIGS. 1 to 3, the heater 45 may be the heating elements further included in the aerosol-generating device.

The first switch 41 may be electrically connected to the heater 45 in series. For example, the first switch 41 may be arranged between the heater 45 and the battery (11 in FIGS. 1 to 3) such that it is electrically connected to the heater 45 in series. Unlike FIG. 6, the first switch 41 may be arranged between the heater 45 and the second switch 42, and the position of the first switch 41 is not limited to the position shown in FIG. 6.

The state of the first switch 41 may be switched between an open state and a closed state according to an external input signal. The heater 45 may not receive power from the battery as the first switch 41 is in an open state, and may receive power from the battery as the first switch 41 is in a closed state.

The first switch 41 may be a field effect transistor (FET). The first switch 41 may be arranged such that a source is connected to the battery side, a drain is connected to the heater 45 side, and a gate is connected to the first processor 43 side.

The state of the first switch 41 may be determined according to the level of a signal transmitted to the gate of the first switch 41. When a signal equal to or greater than a reference value is applied to the gate, current flows from the source to the drain, and the first switch 41 may be closed. Conversely, when a signal less than the reference value is applied to the gate, the first switch 41 may be opened.

The first switch 41 may be a P-channel FET, but is not limited thereto. That is, the first switch 41 may be an N-channel FET.

In addition, the first switch 41 may be another electrical element other than the FET, which is capable of switching between the open state and the closed state according to an external input signal. For example, the first switch 41 may be a bipolar junction transistor (BJT), an insulated gate bipolar transistor (IGBT), or a thyristor, but is not limited to the listed types.

The first switch 41, the heater 45, and second switch 42 may be electrically connected in series. For example, the second switch 42 may be arranged between the heater 45 and ground such that the first switch 41, the heater 45, and the second switch 42 are electrically connected in series. Unlike FIG. 6, the second switch 42 may be arranged between the heater 45 and the first switch 41, and the position of the second switch 42 is not limited to the position shown in FIG. 6.

The state of the second switch 42 may be switched between an open state and a closed state according to an external input signal. The state of the second switch 42 may be repeatedly switched between the open state and the closed state in a short time. The second switch 42 may be repeatedly switched between open state and closed state based on a duty cycle of power required by the heater 45.

The second switch 42, like the first switch 41, may be a field effect transistor (FET). The second switch 42 may be arranged such that a source is connected to the heater 45, a drain is connected to the ground, and a gate is connected to the second processor 44.

The second switch 42 may be an N-channel FET, but is not limited thereto. That is, the second switch 42 may be a P-channel FET.

In addition, the second switch 42, like the first switch 41, may be an electrical element other than the FET, which is capable of switching between the open state and the closed state according to an external input signal. For example, the second switch 42 may be a bipolar junction transistor (BJT), an insulated gate bipolar transistor (IGBT), or a thyristor, but is not limited to the listed types.

The first processor 43 may be implemented as an array of a plurality of logic gates or may be implemented as a combination of a general-purpose microprocessor and a memory in which a program executable in the microprocessor is stored. For example, the first processor 43 may be a micro controller unit including a microprocessor and an input/output module.

The first processor 43 may output a first control signal that controls the open/closed state of the first switch 41. The first processor 43 may output a first control signal that controls the first switch 41 to be closed during a heating period of the heater 45 and to be opened during other periods.

The first control signal may be a direct current (DC) signal. For example, the waveform of the first control signal output from the first processor 43 during the heating period of the heater 45 may be the same as the graph shown on the left side of FIG. 11. In addition, the first processor 43 may output a first control signal having a value higher than a gate reference value of the first switch 41 during the heating period of the heater 45, and may output a first control signal having a value lower than the gate reference value in other periods.

The first processor 43 may receive a temperature value of the heater 45. For example, the first processor 43 may receive the temperature value of the heater 45 measured by a temperature sensor.

The first processor 43 may output the first control signal based on the received temperature value. For example, when the received temperature value is out of a safe heating temperature range or not consistent with the temperature profile, the first processor 43 may output the first control signal to open the first switch 41. That is, when the received temperature value is abnormal, the first processor 43 may determine that the aerosol-generating device is malfunctioning due to a failure of the heater 45, the second processor 44, etc., and output the first control signal to open the first switch 41 so that the heater 45 does not generate heat.

The second processor 44 may be a processor that operates independently of the first processor 43. The second processor 44 may be implemented as an array of a plurality of logic gates or may be implemented as a combination of a general-purpose microprocessor and a memory in which a program executable in the microprocessor is stored. For example, the second processor 44 may be a micro controller unit including a microprocessor and an input/output module.

The second processor 44 may output the second control signal that controls the open/closed state of the second switch 42. The second processor 44 may output the second control signal that causes the state of the second switch 42 to switch between the open state and the closed state so that the heater 45 generates heat according to the temperature profile.

The second control signal may be an alternate current (AC) signal. For example, the second control signal output from the second processor 44 may be a pulse width modulation (PWM) signal such as the graph shown on the right side of FIG. 11. Also, according to the duty cycle of the power required by the heater 45, the second processor 44 may output a second control signal having a value higher than the gate reference value of the second switch 42 so that the second switch 42 is in the closed state, or may output a second control signal having a value lower than the gate reference value of the second switch 42 so that the second switch 42 is in the open state.

In FIG. 6, it is shown that the first processor 43 receives the temperature value of the heater 45, but unlike this, the second processor 44 may receive the temperature value of the heater 45. The second processor 44 may directly receive a sensing value obtained by measuring the temperature of the heater 45 from the temperature sensor or indirectly receive the sensing value through the first processor 43. Alternatively, both the first processor 43 and the second processor 44 may receive the temperature value of the heater 45.

The second processor 44 may output the second control signal based on the received temperature value. For example, when the received temperature value is out of a safe heating temperature range, the second processor 44 may output the second control signal so that the second switch 42 is opened. For another example, when the received temperature value is out of an allowable error range based on the temperature profile of the heater 45, the second processor 44 may output the second control signal so that the second switch 42 is opened. That is, when the received temperature value is abnormal, the second processor 44 may determine that the aerosol-generating device is malfunctioning due to a failure of the heater 45, the first processor 43, etc., and output the second control signal to open the second switch 42 so that the heater 45 does not generate heat.

The first processor 43 and the second processor 44 may communicate with each other. The communication between the first processor 43 and the second processor 44 may be done via serial communication. For example, a universal asynchronous receiver transmitter (UART), serial peripheral interface (SPI), inter integrated circuit (I2C), etc. may be used for the first processor 43 and the second processor 44 to perform serial communication, but is not limited to the listed types.

The second processor 44 may output the second control signal to change the open/closed state of the second switch 42 according to a communication status with the first processor 43. When the first processor 43 malfunctions due to a failure or the like, the communication status between the first processor 43 and the second processor 44 may be defective. For example, the first processor 43, due to a malfunction, may output white noise or a signal that does not conform to a communication protocol or may be in a non-responsive state, so that the communication status between the first processor 43 and the second processor 44 may become defective.

When the communication status with the first processor 43 becomes defective, the second processor 44 may output the second control signal to open the second switch 42 so that the heater 45 does not generate heat. That is, when the communication status with the first processor 43 becomes defective, the second processor 44 may determine that the first processor 43 is malfunctioning and output the second control signal to open the second switch 42 to prevent the heater 45 from generating heat while the first processor 43 malfunctions.

Also, the first processor 43 may output the first control signal so that the open/closed state of the first switch 41 is changed according to a communication status with the second processor 44. When the communication status with the second processor 44 becomes defective, the first processor 43 may determine that the second processor 44 is malfunctioning and may output the first control signal to open the first switch 41 so that the heater 45 is prevented from generating heat.

As described above, the aerosol-generating device may include a plurality of processors, and the first processor 43 and the second processor 44 may control the first switch 41 and the second switch 42, respectively. In particular, the first processor 43 and the second processor 44 may determine the failure of each other through the communication status. As such, when any one of the first processor 43 and the second processor 44 fails, the heater 45 may be prevented from malfunctioning.

Figure 7:
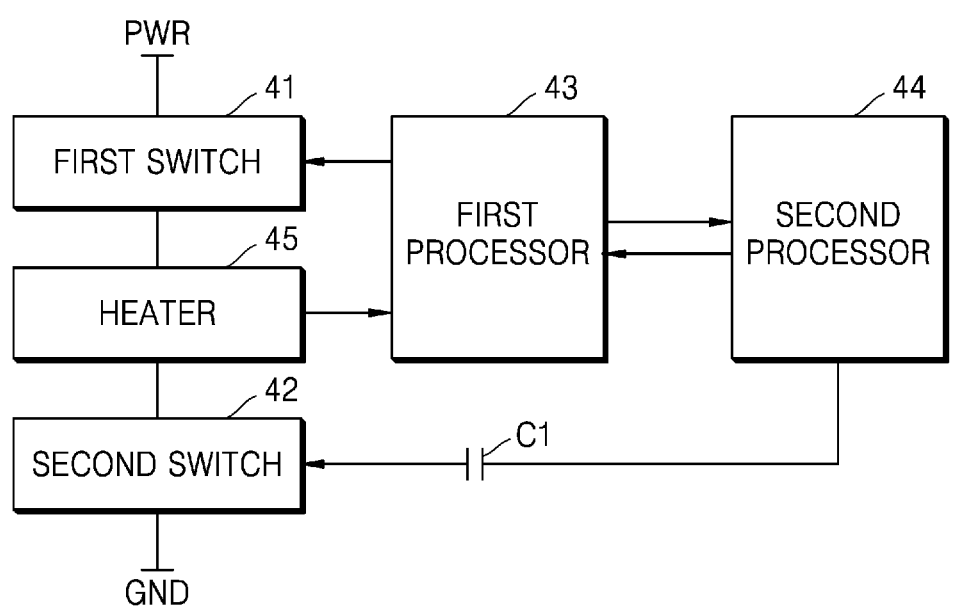
FIG. 7 is a diagram schematically showing an example of a heater control circuit of an aerosol-generating device.

FIG. 7 is a diagram schematically showing an example of a heater control circuit of an aerosol-generating device.

The heater control circuit illustrated in FIG. 7 further includes a capacitor C1 between an output terminal of the second processor 44 and an input terminal of the second switch 42, compared to the heater control circuit illustrated in FIG. 6.

The second processor 44 may output the second control signal so that the open/closed state of the second switch 42 is changed according to the duty cycle of the power required by the heater 45, and the second control signal may be an AC signal. For example, the second control signal may be a PWM signal.

The capacitor C1 has a characteristic of blocking an input signal when the input signal is a DC signal, and passing the input signal when the input signal is an AC signal.

The second processor 44 may output a second control signal of PWM in the normal state, and then output a second control signal that is a DC signal due to a malfunction. In this case, the heater 45 may generate heat or be overheated to a temperature out of the temperature profile. Since the capacitor C1 is mounted at the output terminal of the second processor 44, even if the second processor 44 outputs a DC signal due to the malfunction, the second signal 42 may be prevented from being transmitted to the second switch 42 by the capacitor C1.

Figure 11:
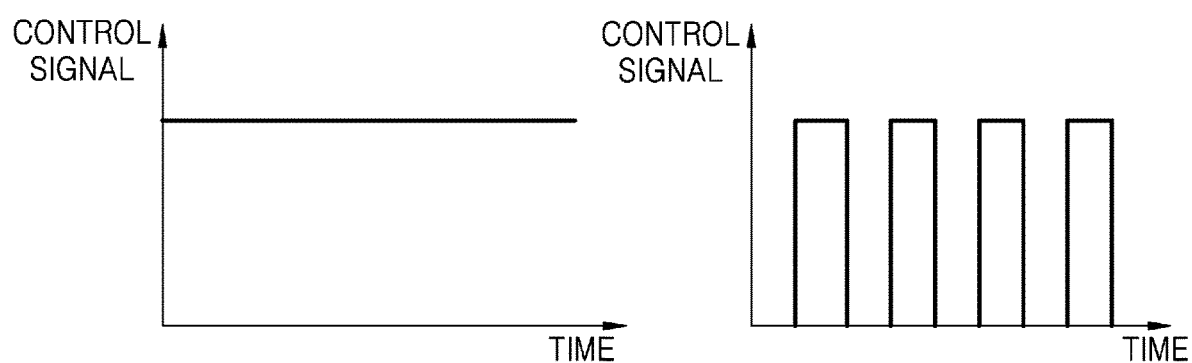
FIG. 11 is a diagram showing examples of waveforms of the first control signal and the second control signal.

Therefore, even if both the first processor 43 and the second processor 44 output a DC signal (for example, a control signal of a waveform such as a graph shown on the left side of FIG. 11) due to a malfunction, the heater 45 may be prevented from generating heat since the second control signal is blocked by the capacitor C1 and the second switch 42 is opened.

Figure 8:
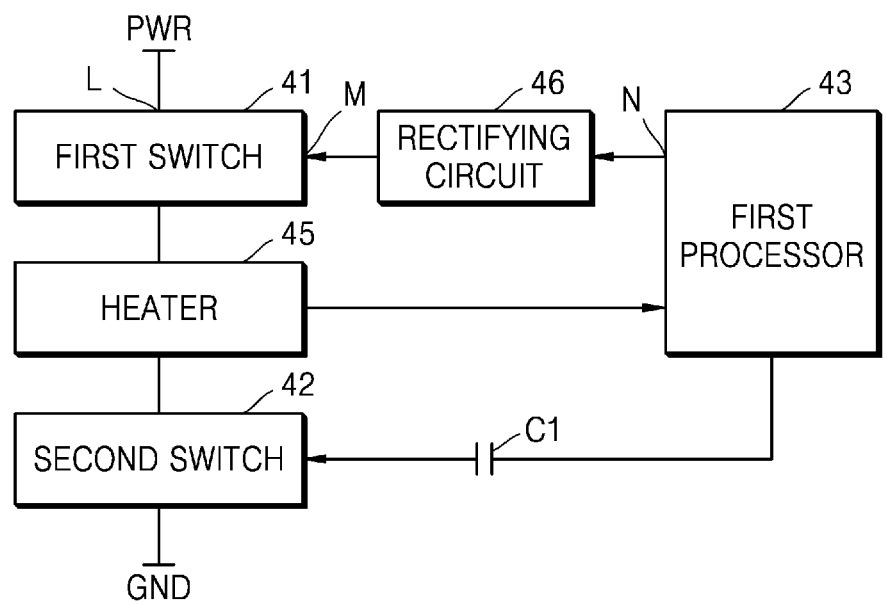
FIG. 8 is a diagram schematically showing an example of a heater control circuit of an aerosol-generating device.

FIG. 8 is a diagram schematically showing an example of a heater control circuit of an aerosol-generating device.

The heater control circuit of the aerosol-generating device includes a first switch 41, a second switch 42, a first processor 43, a heater 45, and a rectifying circuit 46. When compared to the heater control circuit shown in FIG. 7, the heater control circuit shown in FIG. 8 does not include the second processor 44 and further includes a rectifying circuit 46. The rest of configuration is the same.

The heater control circuit may include the rectifying circuit 46. The rectifying circuit 46 may be electrically connected to at least one of input terminals L and M of the first switch, and may be electrically connected to an output terminal N of the first processor 43.

When the received signal is an AC signal, the rectifying circuit 46 may convert the AC signal to a DC signal and output the DC signal. In addition, when the received signal is a DC signal, the rectifying circuit 46 may block the DC signal and may not output the DC signal.

Figure 9:
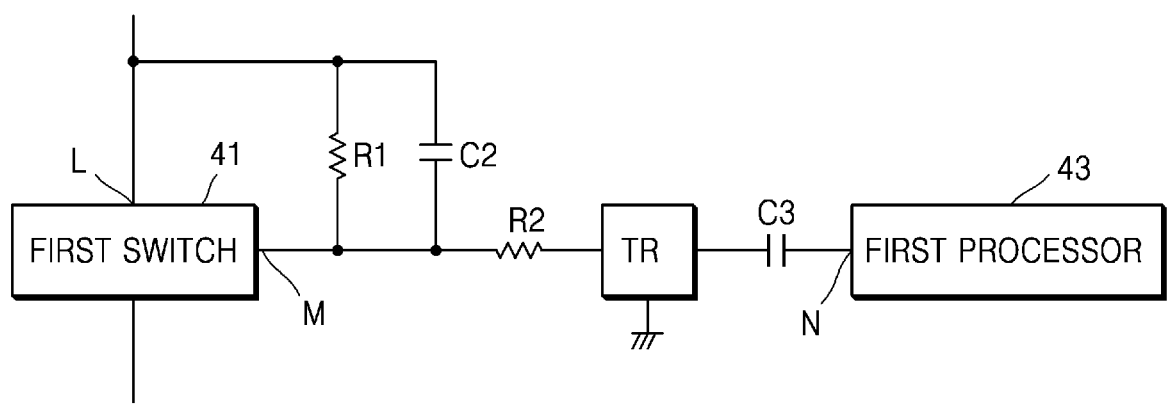
FIG. 9 is a diagram showing an example of a rectifying circuit.

For example, the rectifying circuit 46 may include resistors R1 and R2, capacitors C2 and C3, and a transistor TR as shown in FIG. 9. The transistor may be an NPN transistor, but is not limited thereto.

The resistor R1 and the capacitor C2 may be electrically connected to the source input terminal L and the gate input terminal M of the first switch 41. In addition, the resistor R2, the transistor TR, and the capacitor C3 may be electrically connected to the gate input terminal M of the first switch 41 and the output terminal N of the first processor 43.

The rectifying circuit 46 may be a circuit different from that shown in FIG. 9, and may include other electrical elements such as a diode in addition to the resistors, capacitors, and transistor.

As the heater control circuit illustrated in FIG. 8 further includes the rectifying circuit 46, the first control signal output by the first processor 43 may be an AC signal. For example, the first control signal may be a PWM signal.

When the first processor 43 outputs the PWM signal, the PWM signal is converted into a DC signal by the rectifying circuit 46 and then transmitted to the first switch 41, so that the first switch 41 may be maintained in the closed state.

In addition, as the rectifying circuit 46 includes the capacitor C3, when the first control signal output from the first processor 43 is a DC signal, the first switch 41 may be maintained in the open state. That is, when the first control signal is a DC signal, the first control signal is blocked by the capacitor C3, so that the first switch 41 may be maintained in the open state. Accordingly, even if the first processor 43 outputs a DC signal as the first control signal due to a malfunction, the DC signal is blocked by the rectifying circuit 46, and therefore, the first switch 41 may be opened.

The first processor 43 may output the first control signal that is a PWM signal (for example, a signal having a waveform such as a graph shown on the right side of FIG. 11) in the normal state and then output a DC signal (for example, a signal having a waveform such as a graph shown on the left side of FIG. 11) due to a malfunction. When the DC signal is transmitted to the heater 45, the heater 45 may generate heat or be overheated to a temperature out of the temperature profile. Since the first control signal output from the first processor 43 due to a malfunction corresponds to a DC signal, delivery of the first control signal to the first switch 41 may be blocked by the rectifying circuit 46, and the heater 45 may be prevented from generating heat.

In addition, the first processor 43 may output a PWM signal in the normal state to control the second switch 42 and then output a DC signal due to a malfunction. Even in this case, the DC signal output due to a malfunction may be blocked by the capacitor C1, so that the second switch 42 may be opened, and the heater 45 may be prevented from generating heat.

Therefore, even if the first switch 41 and the second switch 42 are controlled by one processor, since the signal output due to the malfunction of the first processor 43 is blocked by the rectifying circuit 46 and the capacitor C1, the heater 45 may be prevented from generating heat due to a malfunction of the first processor 43.

In addition, even if one of the capacitors C1 and C3 is short-circuited, the DC signal is blocked by the other capacitor, so that the heater 45 may be prevented from generating heat.

Figure 10:
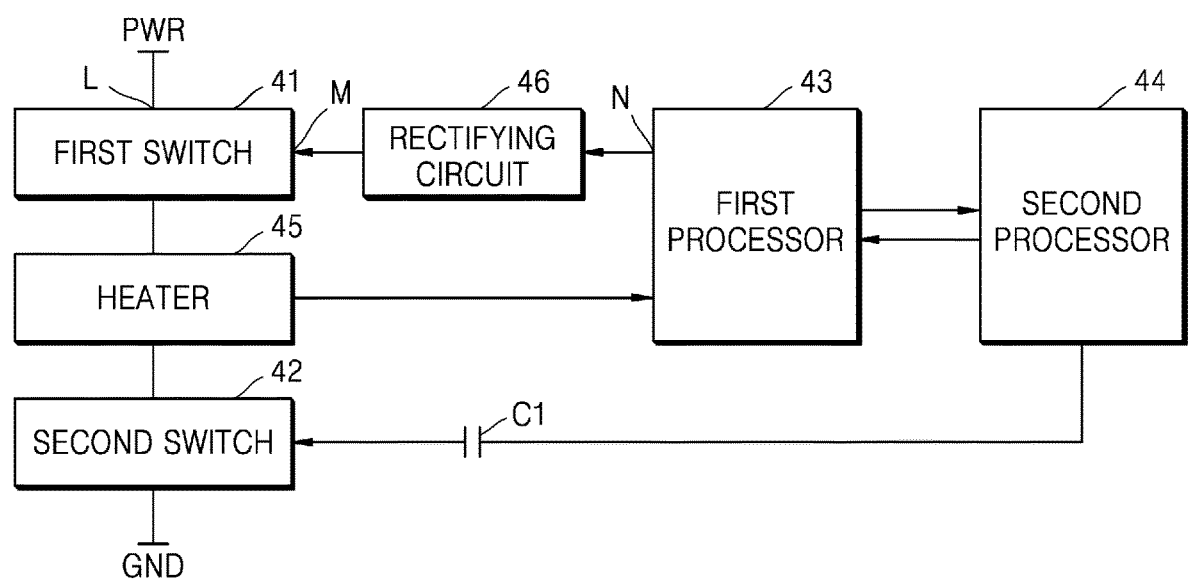
FIG. 10 is a diagram schematically showing an example of a heater control circuit of an aerosol-generating device.

FIG. 10 is a diagram schematically showing an example of a heater control circuit of an aerosol-generating device.

The heater control circuit shown in FIG. 10 further includes a rectifying circuit 46, compared to the heater control circuit shown in FIG. 7.

When the first processor 43 malfunctions, the communication status between the first processor 43 and the second processor 44 may be defective. When the communication status with the first processor 43 is defective, the second processor 44 may determine that the first processor 43 is malfunctioning and output the second control signal so that the second switch 42 is opened. As the second switch 42 is opened, the heater 45 may be prevented from generating heat while the first processor 43 malfunctions.

Likewise, when the second processor 44 malfunctions, the communication status between the first processor 43 and the second processor 44 may be defective. When the communication status with the second processor 44 is defective, the first processor 43 may determine that the second processor 44 is malfunctioning and output the first control signal so that the first switch 41 is opened. As the first switch 41 is opened, the heater 45 may be prevented from generating heat while the second processor 44 malfunctions.

Also, the first processor 43 and the second processor 44 may output a control signal that causes both the first switch 41 and the second switch 42 to be closed due to a malfunction. For example, the first processor 43 and the second processor 44 may output a DC signal such as the graph shown on the left side of FIG. 11 due to a malfunction. In this case, the first control signal is blocked by the rectifying circuit 46, and the second control signal is blocked by the capacitor C1, so that the first switch 41 and the second switch 42 may be in the open state. As the first switch 41 and the second switch 42 are in the open state, even if both the first processor 43 and the second processor 44 malfunction, the heater 45 may be prevented from generating heat.

Figure 12:
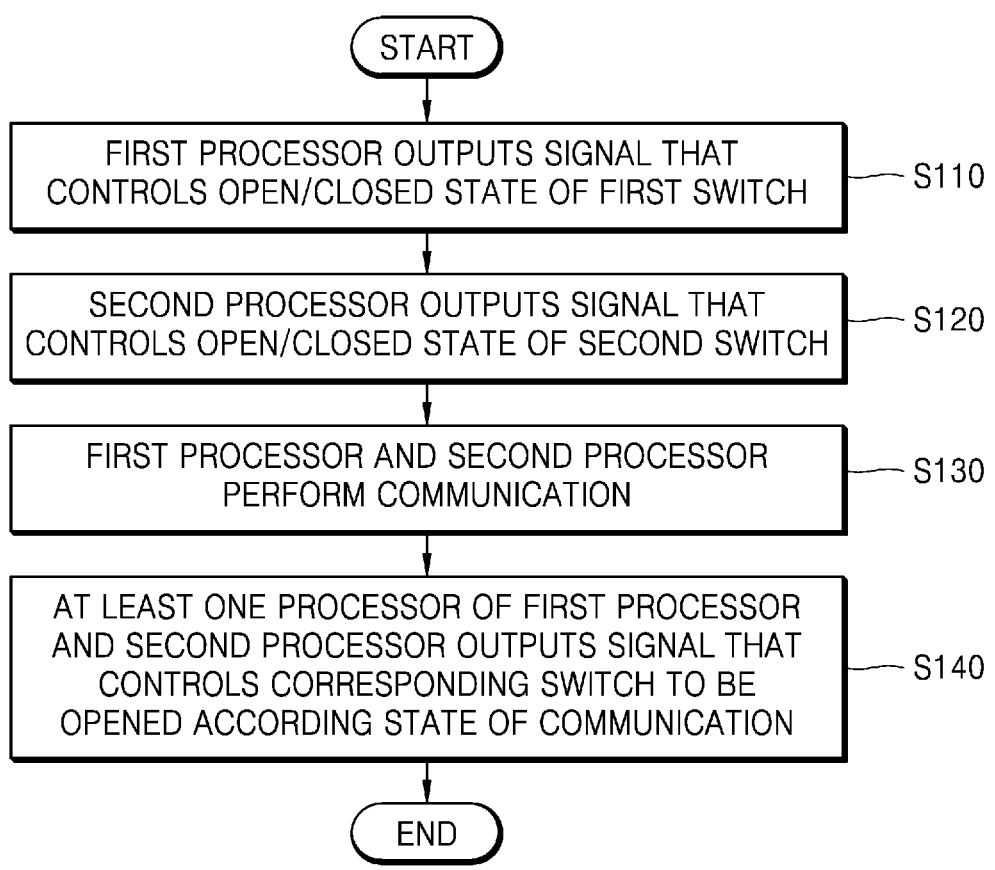
FIG. 12 is a flowchart illustrating an example of a method of controlling a heater of an aerosol-generating device.

FIG. 12 is a flowchart illustrating an example of a method of controlling a heater of an aerosol-generating device.

Referring to FIG. 12, the method of controlling the heater includes operations that are processed sequentially in the heater control circuits illustrated in FIGS. 6 to 8 and 10. Therefore, it may be seen that the contents described above with respect to the heater control circuits shown in FIGS. 6 to 8 and 10 are applied to the method of controlling the heater of FIG. 12 even if the contents are not described below.

In operation S110, the first processor 43 may output the first control signal that controls the open/closed state of the first switch 41. The first processor 43 may output the first control signal that controls the first switch 41 to be closed during the period in which the heater 45 needs to be heated, and the first switch 41 to be opened during other periods.

In operation S120, the second processor 44 may output the second control signal that controls the open/closed state of the second switch 42. The second processor 44 may output the second control signal that repeatedly switches the state of the second switch 42 between the open state and the closed state so that the heater 45 generates heat according to the temperature profile.

In operation S130, the first processor 43 and the second processor 44 may perform communication. The communication method performed between the first processor 43 and the second processor 44 may be serial communication. For example, a universal asynchronous receiver transmitter (UART), serial peripheral interface (SPI), inter integrated circuit (I2C), etc. may be used for the first processor 43 and the second processor 44 to perform serial communication, but is limited to the listed types.

In operation S140, the second processor 44 may output the second control signal so that the open/closed state of the second switch 42 is changed according to a communication status with the first processor 43. Also, the first processor 43 may output the first control signal so that the open/closed state of the first switch 41 is changed according to a communication status with the second processor 44.

As described above, the aerosol-generating device includes a plurality of processors, and the first processor 43 and the second processor 44 may control the first switch 41 and the second switch 42, respectively. In particular, the first processor 43 and the second processor 44 determine the failure of each other through the communication status, so that when any one of the first processor 43 and the second processor 44 malfunctions, the heater 45 may be prevented from being abnormally operated.

Those of ordinary skill in the art related to the present embodiments may understand that various changes in form and details can be made therein without departing from the scope of the characteristics described above. The disclosed methods should be considered in a descriptive sense only and not for purposes of limitation. The scope of the present disclosure is defined by the appended claims rather than by the foregoing description, and all differences within the scope of equivalents thereof should be construed as being included in the present disclosure.

What is claimed is:

1. An aerosol-generating device comprising:
    a heater;
    a first switch electrically connected to the heater in series;
    a second switch electrically connected to the heater and the first switch in series;
    a first processor configured to output a first control signal that controls an open/closed state of the first switch;
    a rectifying circuit connected to an output terminal of the first processor and an input terminal of the first switch;
    a second processor configured to perform communication with the first processor, and output a second control signal that controls an open/closed state of the second switch such that the open/closed state of the second switch is changed based on a communication status with the first processor; and
    a capacitor connected to an output terminal of the second processor and an input terminal of the second switch,
    wherein, when a DC signal due to a malfunction of the first processor is output as the first control signal, the first control signal is blocked by the rectifying circuit and the first switch is opened, and
    wherein, when a DC signal due to a malfunction of the second processor is output as the second control signal, the second control signal is blocked by the capacitor and the second switch is opened.

2. The aerosol-generating device of claim 1, wherein when the communication status with the first processor is defective, the second processor outputs the second control signal such that the second switch is opened.

3. The aerosol-generating device of claim 1, wherein the first processor outputs the first control signal such that the open/closed state of the first switch is changed according to a communication status with the second processor.

4. The aerosol-generating device of claim 3, wherein when the communication status with the second processor is defective, the first processor outputs the first control signal such that the first switch is opened.

5. The aerosol-generating device of claim 1, wherein the first processor and the second processor perform serial communication.

6. The aerosol-generating device of claim 1, wherein
    the first control signal is a signal that closes the first switch during a period in which the heater is heated, and
    the second control signal is a signal that repeatedly opens and closes the second switch according to a power duty cycle of the heater during the period in which the heater is heated.

7. The aerosol-generating device of claim 1, wherein the first switch and the second switch are field effect transistors.

8. The aerosol-generating device of claim 1, wherein the first control signal and the second control signal are pulse width modulation signals.

9. The aerosol-generating device of claim 1, wherein
    at least one processor of the first processor and the second processor receives a temperature sensing value of the heater, and
    the at least one processor outputs a control signal such that at least one of the first and second switches corresponding to the at least one processor is opened when the received temperature sensing value is abnormal.

10. The aerosol-generating device of claim 1, wherein the first control signal and the second control signal are pulse width modulation signals.

11. A method of blocking power for a heater of an aerosol-generating device, the method comprising:
    outputting, from a first processor, a signal that controls an open/closed state of a first switch electrically connected to the heater in series;
    outputting, from a second processor, a signal that controls an open/closed state of a second switch electrically connected to the heater and the first switch in series;
    performing communication between the first processor and the second processor; and
    outputting, from at least one processor of the first and second processors, a signal that controls at least one of the first and second switches corresponding to the at least one processor to be opened according to a communication status between the first processor and the second processor;
    wherein, when a DC signal due to a malfunction of the first processor is output as a first control signal, blocking the first control signal using a rectifying circuit connected to an output terminal of the first processor and an input terminal of the first switch and opening the first switch, and
    wherein, when a DC signal due to a malfunction of the second processor is output as a second control signal, blocking the second control signal using a capacitor connected to an output terminal of the second processor and an input terminal of the second switch.

* * * * *